United States Patent
Hughes (10) Patent No.: US 6,185,222 B1
(45) Date of Patent: *Feb. 6, 2001

(54) ASYMMETRIC SWITCH ARCHITECTURE FOR USE IN A NETWORK SWITCH NODE

(75) Inventor: David A. Hughes, Mountain View, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/535,347

(22) Filed: Sep. 28, 1995

(51) Int. Cl.$^7$ .................................................. H04L 12/56
(52) U.S. Cl. ........................... 370/414; 370/416; 370/418
(58) Field of Search ..................................... 370/389, 412, 370/413, 414, 415, 416, 418, 419, 428, 427, 429, 380; 340/825.03, 825.26

(56) References Cited

U.S. PATENT DOCUMENTS

| | | | |
|---|---|---|---|
| 4,623,996 | 11/1986 | McMillen | 370/60 |
| 4,630,258 | * 12/1986 | McMillen et al. | 370/411 |
| 4,774,705 | * 9/1988 | Eaves, Jr. | 370/411 |
| 5,126,999 | * 6/1992 | Munter et al. | 370/415 |
| 5,130,975 | * 7/1992 | Akata | 370/427 |
| 5,148,428 | * 9/1992 | Lee | 370/411 |
| 5,276,425 | * 1/1994 | Swanson et al. | 340/826 |
| 5,440,523 | * 8/1995 | Joffe | 365/230.5 |
| 5,506,841 | * 4/1996 | Sandquist | 370/412 |
| 5,517,495 | * 5/1996 | Lund et al. | 370/399 |
| 5,544,160 | * 8/1996 | Cloonan | 370/413 |

OTHER PUBLICATIONS

"Shared Output Buffer–Type Switching Architecture With Fair Output Port Contention", Tode, et al., Electronics and Communications in Japan, Part 1 Communications, Apr. 1995, pp. 62–76.

"Expandable ATOM Switch Architecture (XATOM) For ATM LANs", Fan, et al., Serving Humanity Through Communications, SUPERCOMM/ICC, New Orleans, May 1994, pp. 402–409.

(List continued on next page.)

*Primary Examiner*—Chau Nguyen
*Assistant Examiner*—Soon-Dong Hyun
(74) *Attorney, Agent, or Firm*—Blakely, Sokoloff, Taylor & Zafman, LLP (57) ABSTRACT

In a network switch node, an asymmetric switch. The asymmetric switch comprises a plurality N of inputs each for coupling to a corresponding one of a plurality N of port modules and a plurality M of outputs each for coupling to one of the plurality of port modules. M is greater than N such that at least one of the plurality of port modules is coupled to more outputs than inputs. The asymmetric switch also includes a switching fabric operative to switch packets received from the inputs to the outputs. According to one embodiment, M=kN such that each port module can have one input line to the asymmetric switch and k output lines from the asymmetric switch. Such an asymmetric switch-to-port interface results in less blocking and allows output buffering wherein the output buffers are provided at the ports, rather than at the switch.

26 Claims, 9 Drawing Sheets

OTHER PUBLICATIONS

"Dynamic Priority Schemes For Fast Packet Switches", Wong, et al., Institute of Electrical and Electronics Engineers, May 1994, pp. 538–544.

"A High–Speed ATM Switch Architecture for FTTH", Doi, et al., NTT Network Service System Laboratories, Japan, Apr. 1995, pp. 384–388.

"622 Mb/s 8X8 Shared Multibuffer ATM Switch With Hierarchical Queueing And Multicast Functions", Proceedings Of The Global Telecommunications Conference (GLOBECOM), Houston, Nov. 1993, pp. 1488–1495.

Tode, H. et al., "Shared Output Buffer–Type Switching Architecture With Fair Output Port Contention," Electronics & Communications In Japan, vol. 78, pp. 62–76, (Apr. 1, 1995).

Ruixue, F. et al., Expandable ATOM Switch Architecture (XATOM) for ATM LANs, Supercomm/ICC, vol. 1, IEEE, pp. 402–409, (May 1–5, 1994).

Wong, P.C. et al., "Dynamic Priority Schemes For Fast Packet Switches," Proceedings Of The International Conference Of Communications vol. 1, IEEE, pp. 538–544 (Jun. 18–22).

Yukihiro, D. et al., "A High–Speed ATM Switch Architecture For FTTH–AN ATM Switch Architecture With Input And Cross–Point Buffers," ISS '95, vol. 1, pp. 384–388, (Apr. 23–28).

Yamanaka, H. et al., "622 MB/S 8X8 Shared Multibuffer ATM Switch With Hierarchical Queueing And Multicast Functions," (GLOBCOM), vol. 3, IEEE, pp. 1488–1495, (Nov. 29–Dec. 2, 1993).

International Search Report For Counterpart Application No.: PCT/US96/14637, pp. 1–2, (Feb. 2, 1997).

T. Lee, "A Modular Architecture For Very Large Packet Switches," Conf. Rec., GLOBECOM '89, vol. 3, pp. 1801–1809, 1989.

S.C. Liew and K.W. Lu "A 3–Stage Interconnection Structure For Very Large Packet Switches," Conf. Rec., ICC '90, pp. 316.7.1–316.7.7, 1990.

H. Suzuki et al., "Output–buffer Switch Architecture For Asynchronous Transfer Mode," Conf. Rec., ICC '89, vol. 1, pp. 99–1–3, 1989.

A. Pattavina, "Multichannel Bandwidth Allocation In A Broadband Packet Switch," IEEE J. Select. Areas Commun., vol. 6, No. 9, pp. 1489–1499, Dec. 1988.

M.G. Hluchyj and M.J. Karol, "Queueing In High–Performance Packet Switching," IEEE J. Select. Areas Commun., vol. 6, No. 9, pp. 1587–1597, Dec. 1988.

J.Y. Hui and E. Arthurs, "A Broadband Packet Switch for Integrated Transport," IEEE J. Select. Areas Commun., vol. 5, No. 8, 1264–1273, Oct. 1987.

M.J. Karol, M.G. Hluchyj, and S.P. Morgan, "Input Versus Output Queueing On A Space–Division Packet Switch," IEEE Trans. Commun., vol. 35, No. 12, pp. 1347–1356. Dec.

Y. Oie et al., "Effect of Speedup In Nonblocking Packet Switch," Conf. Rec., ICC '89, vol. 1, pp.410–415, 1989.

Y. Yeh et al., "The Knockout Switch: A Simple Modular Architecture For High–performance Packet Switching," IEEE J. Select. Areas Commun., vol. 5, No. 8, pp. 1274–1283, Oct. 1987.

S.C. Liew and K. W. Lu, "Comparison Of Buffering Strategies For Asymmetric Packet Switch Modules," IEEE J. Select. Areas Commun., vol. 9, No. 3, 1991.

J. Garcia–Haro and A. Jajszczyk, "ATM Shared–Memory Switching Architectures," IEEE Network, Jul./Aug. 1994.

K. Y. Eng et al., "A Growable Packet (ATM) Switch Architecture: Design Principles and Applications," IEEE Trans. Commun., vol. 40, No. 2, 1992.

M. J. Karol and Chih–Lin I., "Performance Analysis Of A Growable Architecture For Broad–Band Packet (ATM) Switching," IEEE Trans. Commun., vol. 40, No. 2,. 1992.

* cited by examiner

ASYMMETRIC SWITCH ARCHITECTURE FOR USE IN A NETWORK SWITCH NODE

FIELD OF THE INVENTION

The present invention relates generally to network switch nodes and more particularly to an asymmetric switch architecture for use in a network switch node.

BACKGROUND OF THE INVENTION

Packet-switched and cell-switched networks use switch nodes to provide a shared transmission path for a multiplicity of ports, thereby reducing the overall cost and complexity of the ports and the network. A port may be coupled to a trunk such as an OC3 line for communicating to another switch node. Alternatively, a port may be coupled to an endpoint of a network such as customer premise equipment (CPEs).

Figure 1:
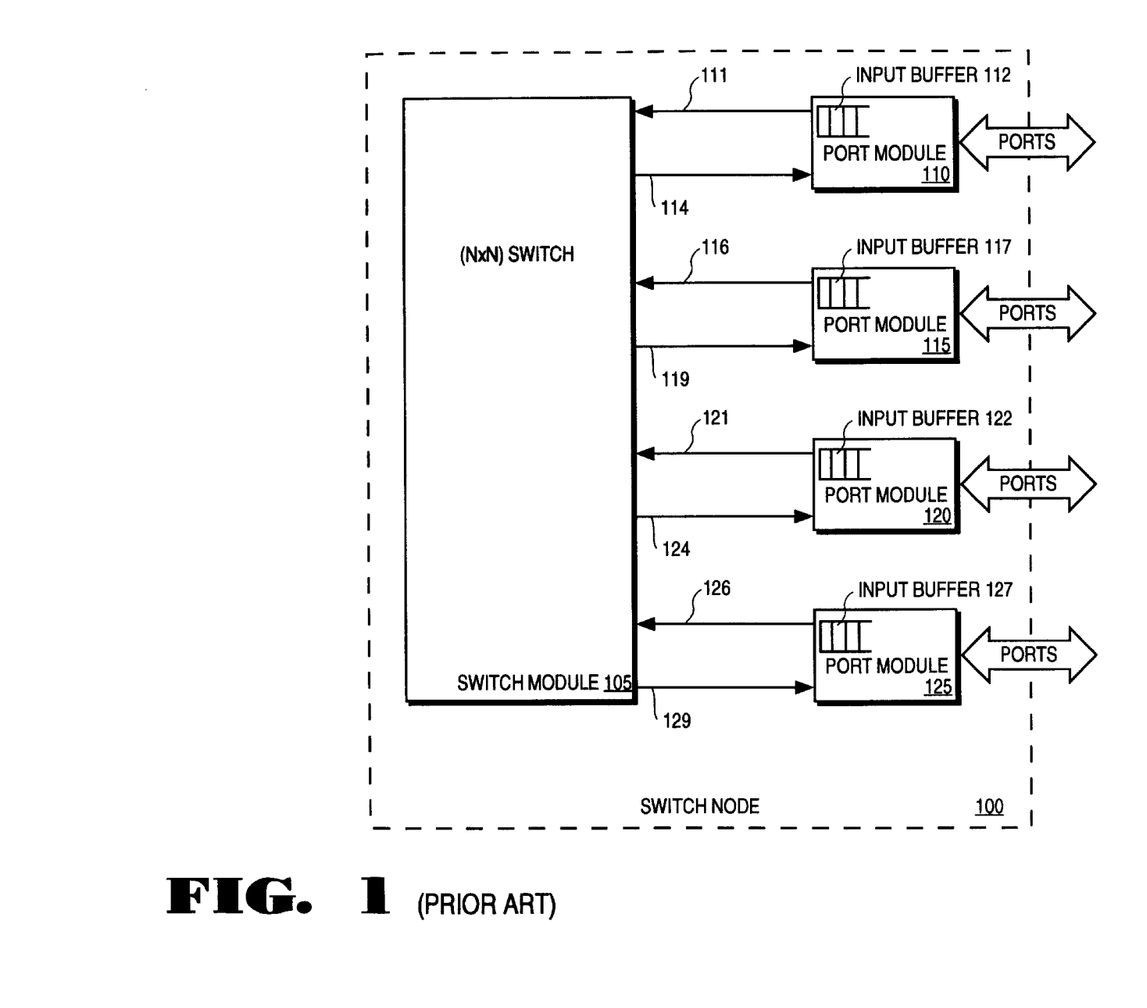
FIG. 1 shows a prior art switch node that uses input buffering for preventing loss of blocked packets.

FIG. 1 shows a prior art switch node 100 that comprises switch module 105 and port modules 110, 115, 120, and 125. Switch module 105 functionally operates as an N×N switching fabric having N inputs and N outputs. Therefore, for the example of N=4, switch module 105 is connected to port module 110 via input line 111 and output line 114, to port module 115 via input line 116 and output line 119, to port module 120 via input line 121 and output line 124, and to port module 125 via input line 126 and output line 129.

Port modules 110, 115, 120, and 125 use switch module 105 as a common interconnect for switching data packets between one another. The throughput of a switch module output is limited to the throughput of an output line, which typically results in only one packet being switched per output per transaction or "connection" cycle of switch module 100. Therefore, output or "port" contention arises when multiple port modules attempt to simultaneously transmit packets to the same destination port. Because only one packet may be switched to the destination port per connection cycle, the other packets are "blocked," and data loss can occur.

Packet buffering is typically performed to prevent the loss of blocked packets. For example, each of the port modules of switch node 100 includes input buffers to prevent packet loss due to contention for the same destination port module. Input buffers 112, 117, 122, and 127 are shown as first in first out buffers (FIFOs) and store all packets that are to be switched in a first-in-first-out manner, regardless of their destination port. Switch node 100 is said to use "input buffering" because packets are buffered by the port modules before they enter the switching fabric of switch module 105.

Input buffering allows switch module 105 to operate at the input line speed, which reduces the complexity and cost of switch module 105; however, the throughput of the switch node may be significantly reduced if port contention occurs. When a packet or cell at the head of a FIFO must wait for transmission, all subsequent packets in the FIFO must also wait even though their destination ports may be available during the present connection cycle. This phenomenon is called "head-of-line blocking."

Figure 2:
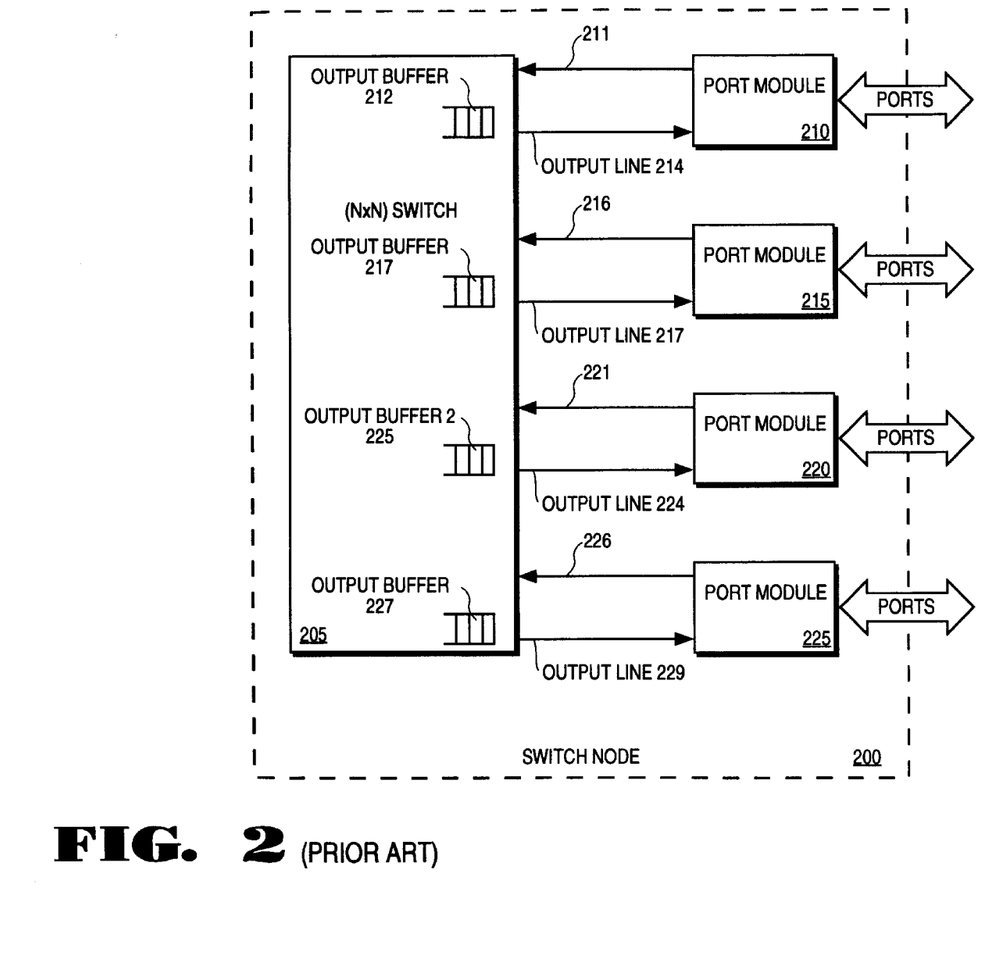
FIG. 2 shows a prior art switch node that uses output buffering for preventing loss of blocked packets.

An alternative switch node architecture uses output buffering to provide improved performance relative to input buffered switch nodes. FIG. 2 shows a prior art switch node 200 that uses output buffering and comprises switch module 205 and port modules 210, 215, 220, and 225. Switch module 205 functionally operates as an N×N switch matrix. Therefore, for the example of N=4, switch module 205 is connected to port module 210 via input line 211 and output line 214, to port module 215 via input line 216 and output line 219, to port module 220 via input line 221 and output line 224, and to port module 225 via input line 226 and output line 229. To guard against data loss due to output contention, switch module 205 includes output buffers associated with each of the port modules. Output buffers 212, 217, 222, and 227 are shown as FIFOs, but they may be implemented using a shared memory architecture.

Output buffering eliminates the head-of-line blocking effect of input buffered switch nodes. The primary drawback of an output buffered switch node is that switch module 205 must be operated N times faster than the input line speed, which significantly increases the complexity and cost of switch module 205 when compared to switch module 105 of input buffered switch node 100. For example, output buffering according to the prior art typically requires that output buffers be placed on the switch module because each output line only allows one packet to be passed to a port module per connection cycle wherein up to N−1 packets may be received for transfer per connection cycle. The output buffers must operate at the speed of the switch module 205, and memory costs are therefore significantly increased when compared to the memory costs for input buffering.

SUMMARY AND OBJECTS OF THE INVENTION

Therefore, it is an object of the invention to provide an improved switch node architecture.

This and other objects of the invention are provided by an asymmetric switch that comprises a plurality N of inputs each for coupling to a corresponding one of a plurality N of port modules and a plurality M of outputs each for coupling to one of the plurality of port modules. M is greater than N such that at least one of the plurality of port modules is coupled to more outputs than inputs. The asymmetric switch also includes a switching fabric operative to switch packets received from the inputs to the outputs. According to one embodiment, M=kN such that each port module can have one input line to the asymmetric switch and k output lines from the asymmetric switch. Such an asymmetric switch-to-port interface results in less blocking and allows output buffering wherein the output buffers are provided at the port modules, rather than at the switch.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

An improved switch node architecture having an asymmetric switching fabric is described. The asymmetric switching fabric has N inputs and M outputs, wherein M>N. According to one embodiment, M is an integer multiple of N, i.e. M=kN. In this manner, each port module of the switch node may be coupled to one input and k outputs of the switching fabric such that k source port modules may simultaneously transmit to the same destination port module without buffering. Such an asymmetric switch-to-port interface results in less contention and less blocking. The asymmetry of the switch-to-port interface also allows for output buffering wherein the output buffers are placed in the port modules rather than in the switch module, which reduces memory costs.

A number of terms will be used consistently throughout the following discussion. For example, a switch module will be referred to simply as a "switch," and the interface between a port module and a switch module will be referred to as a "switch-to-port interface." Furthermore, because cells are fixed length packets, the term "packet" will be used to refer to both cells and packets. The consistent use of these terms is intended to simplify discussion and should not be construed as limiting the manner in which the present invention may be practiced.

Figure 3:
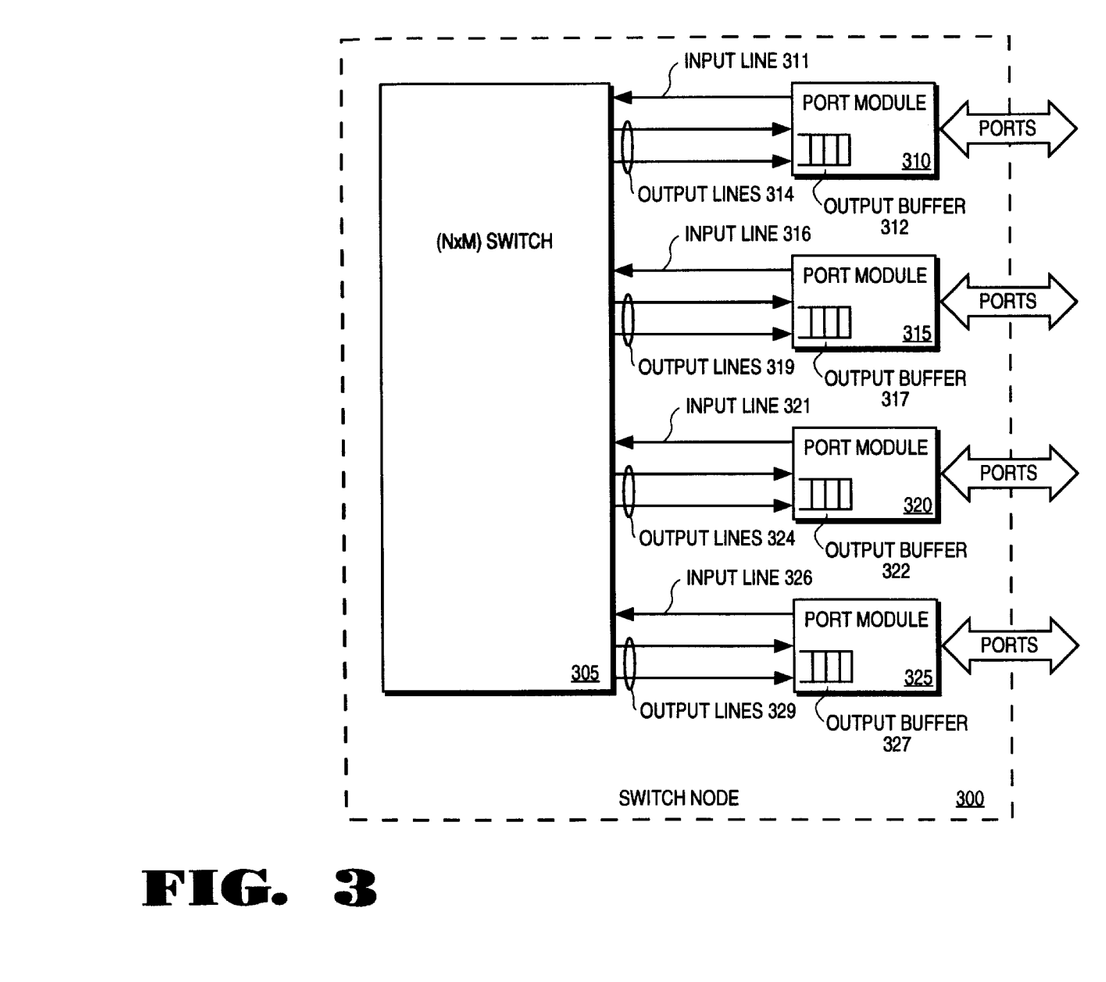
FIG. 3 shows a switch node that includes an asymmetric switch architecture according to a present embodiment.

FIG. 3 shows a switch node 300 that includes an N×M switch 305 having N inputs and M outputs wherein N may be any arbitrary number, and M>N. According to the present embodiment, M=kN, wherein N=4 and k=2. The number k may be any arbitrary number and is not necessarily an integer.

N×M switch 305 is shown as being coupled to each of port modules 310, 315, 320, and 325 via one input line and k output lines (k=2) wherein the input and output lines may be implemented as a backplane bus. Specifically, port module 310 is coupled to switch 305 via input line 311 and two output lines 314, port module 315 is coupled to switch 305 via input line 316 and two output lines 319, port module 320 is coupled to switch 305 via input line 321 and two output lines 324, and port module 325 is coupled to switch 305 via input line 326 and two output lines 329. According to one embodiment, each port module is coupled to a multiplicity of ports wherein the combined bandwidth or data rates of the ports exceed the bandwidth of the input lines.

It is not required that every port module be provided with an asymmetric interface to switch 305. For example, port modules 310 and 315 may each be coupled to three output lines wherein port modules 320 and 325 are coupled to only one output line. Furthermore, if the output lines coupled between the switch and the port modules have a greater throughput than the input lines—e.g. if the throughput of an output line equals k times the throughput of an input line—the number of output lines that are physically provided may be equal to the number of input lines.

For one embodiment, switch node 300 is implemented in a chassis that includes a backplane bus having multiple expansion slots. A switch module that includes N×M switch and at least one port module that requires a single set of switch I/O lines and includes a multiplicity of port interfaces are placed in the expansion slots. Other equivalent implementations may be used.

Providing multiple output lines or "channels" from the switch to a port module allows multiple packets to be switched simultaneously to the same port module. This, in turn, allows the output buffers to be moved from the switch to the modules thereby reducing the memory costs typically associated with output buffering. Therefore, port module 310 is shown as including output buffer 312, port 315 is shown as including output buffer 317, port module 320 is shown as including output buffer 322, and port module 325 is shown as including output buffer 327. Each of output buffers 312, 317, 322, and 327 are shown as first in first out (FIFO) buffers and may be implemented in any one of many alternative arrangements.

The asymmetric switch-to-port interfaces of switch node 300 reduce blocking due to port contention when compared to switch nodes that use symmetric switch-to-port interfaces. Port contention may be completely eliminated if M=N(N−1). For large switching fabrics setting M=N(N−1) is impractical because of the added cost and complexity of switch 305. Switch 305 may be designed to further reduce port contention when M<N(N−1).

Figure 4:
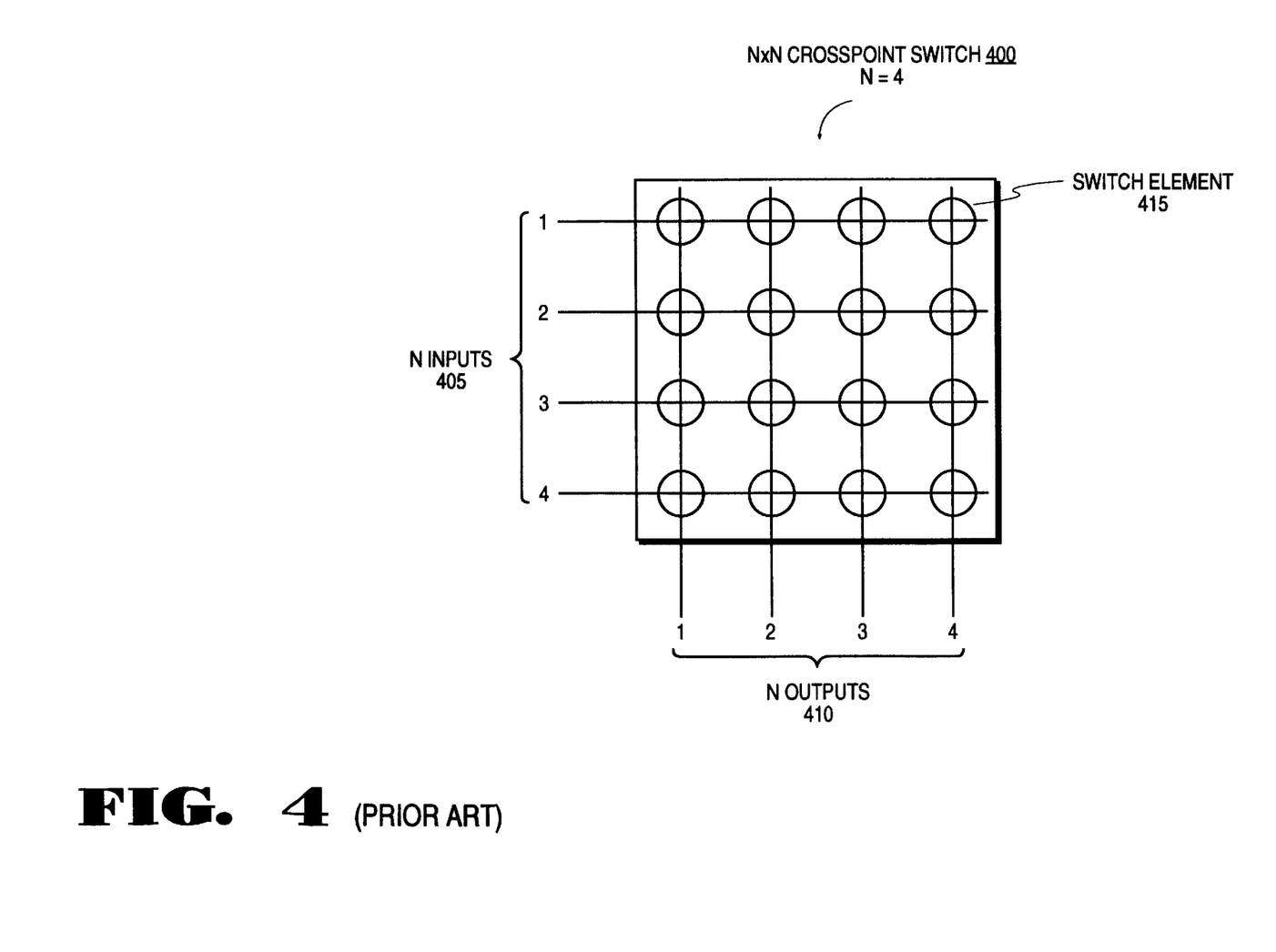
FIG. 4 shows a symmetric crosspoint switching fabric according to the prior art.

One type of switching fabric is the crosspoint switch, and FIG. 4 shows a symmetric N×N crosspoint switch according to the prior art. Crosspoint switch 400 includes N inputs 405, N outputs 410, and N×N switch elements 415, wherein N=4. Inputs 405 are shown as horizontal lines, and outputs 410 are shown as vertical lines. Switch elements 415 are shown as circles and are provided at each point of intersection between the horizontal lines of inputs 405 and the vertical lines of outputs 410. It should be noted that a crosspoint switch need not be implemented as a matrix of switching elements. For example, a bus architecture may be designed to operate as a crosspoint switch, as is well known in the art.

Each of the inputs and the outputs of crosspoint switch 400 are labeled 1–4 and indicate that the corresponding inputs and outputs are coupled to port modules 1–4, respectively. If a connection is desired between a first port module coupled to input 1 and a second port module coupled to output 2, the switch element coupled to both input 1 and output 2 is switched on to provide an electrical path between input 1 and output 2. Otherwise, the switch element coupled to input 1 and output 2 is switched off such that input 1 is decoupled from output 2. If connections are desired between the first port module and the second port module and between a third port module coupled to input 3 and the second port module, the prior art crosspoint switch matrix can only provide one connection.

Figure 5:
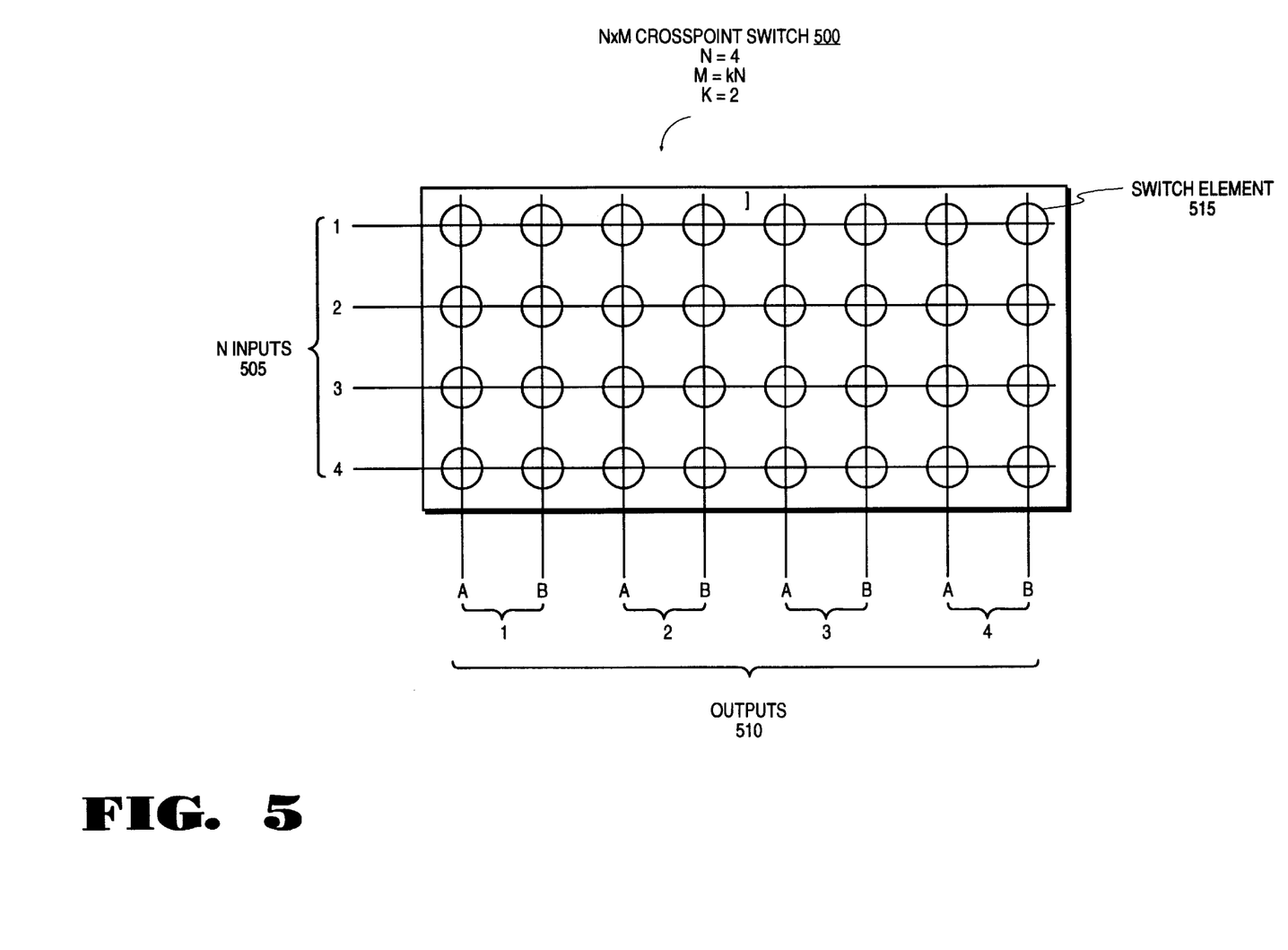
FIG. 5 shows an asymmetric crosspoint switching fabric according to a present embodiment.

FIG. 5 shows an asymmetric N×M crosspoint switch 500 according to one embodiment. Crosspoint switch 500 includes N inputs 505, M outputs 510, and N×M switch elements 515 wherein inputs 505 are shown as horizontal lines, outputs are shown as vertical lines, and switch elements 515 are shown as circles at the intersections between the horizontal and vertical lines. FIG. 5 continues the example wherein M=kN and k=2. Crosspoint switch 500 may alternatively be provided by designing an appropriate bus architecture.

Unlike the symmetric crosspoint switch of the prior art, crosspoint switch 500 can provide multiple paths to a single destination port module. According to the present embodiment, each output of crosspoint switch 500 is provided as one of k channels or paths to each port module, and each of the port modules 1–4 are therefore shown as being provided with an A channel and a B channel. Wherein crosspoint switch 500 can simultaneously provide a maximum of two output paths to the same destination port module, a maximum of three ports can request access to the same destination port at any given time. Therefore, port contention can still occur when k<N−1.

Figure 6:
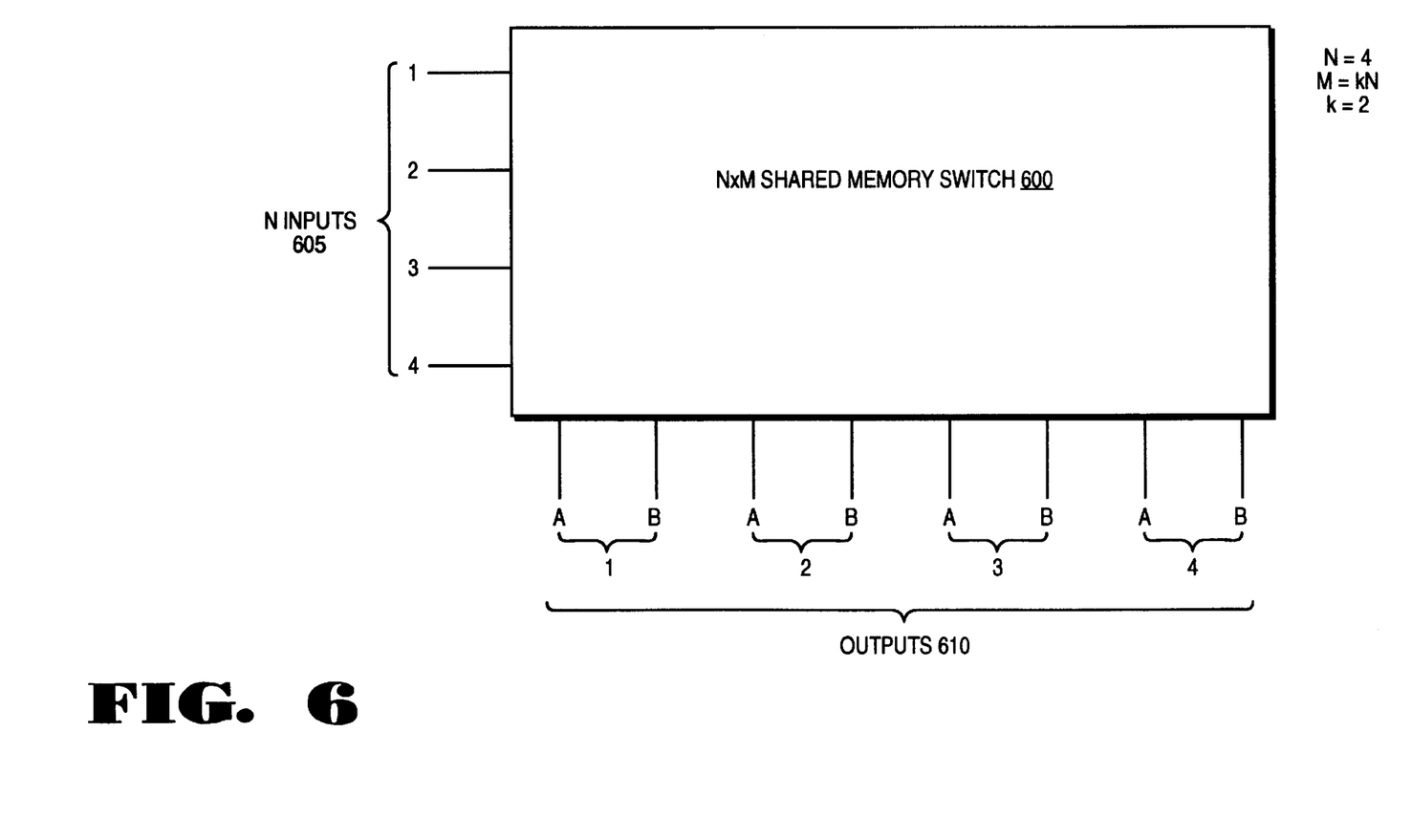
FIG. 6 shows an asymmetric shared memory switching fabric according to a present embodiment.

FIG. 6 shows an alternative switching fabric wherein switch 305 comprises an N×M shared memory switching fabric 600 having N inputs 605 and M outputs 610. Shared memory switching architectures are known in the art and may be readily modified to be asymmetric. Other known switching architectures may also be modified to be asymmetric Shared memory switching fabrics are known to provide generally superior performance to crosspoint switching fabrics. Unfortunately, shared memory switching fabrics tend to be much more complex and much more expensive than crosspoint switching fabrics. Modifications to crosspoint switching fabrics can provide similar performance to shared memory switching fabrics.

Figure 7:
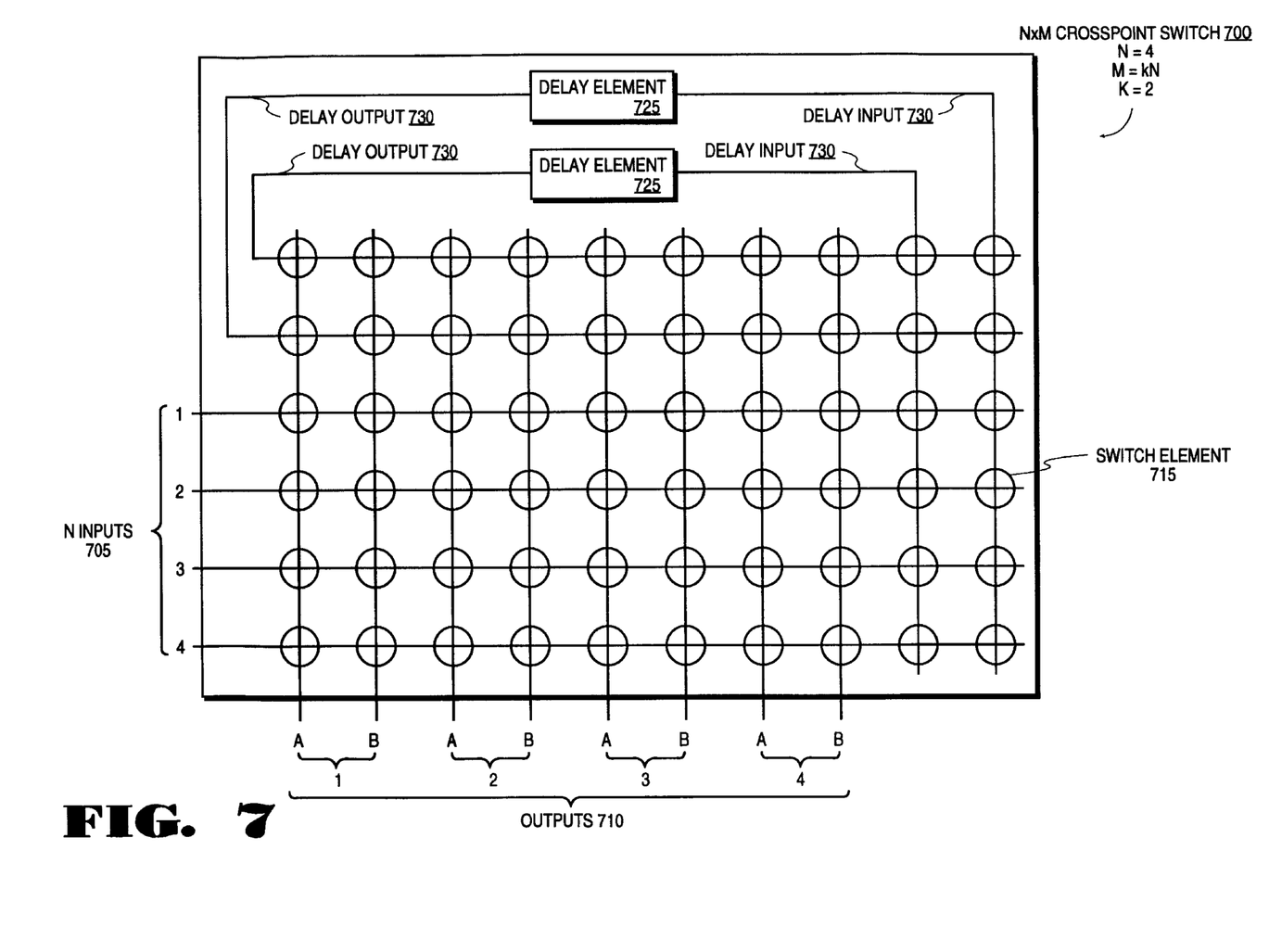
FIG. 7 shows an asymmetric crosspoint switching fabric according to a present embodiment that further includes loopback memory for reducing blocking.

For example, FIG. 7 shows an asymmetric crosspoint switch 700 that uses delay loops or "loopback memory" to reduce blocking due to excessive port contention. Only two delay loops are used for the embodiment of FIG. 7, but additional delay loops may be provided to increase the overall throughput of the switch. Like crosspoint switch 500, crosspoint switch 700 includes N inputs 705 and M outputs 710 wherein the outputs 710 are provided as channel pairs to each of the ports. Crosspoint switch 700 is additionally provided with two delay loops each comprising a delay input 720, a delay element 725, and a delay output 730. The delay inputs 720 are shown as vertical lines and are provided as alternative "outputs" to those connected to the ports. Similarly, delay outputs 730 are shown as horizontal lines and are provided as alternative "inputs" to those connected to the ports. Additional switch elements 715 are required to provide connectivity to the delay loops, and the total number of switch elements 715 is equal to ((N×M)+L(N+M+L)), wherein L is equal to the number of delay loops.

Each delay element 725 provides one connection cycle of delay. If no channels of a particular port are available during a given connection cycle, the signal at the input destined for that port is routed through a delay loop, and the output of the delay loop may be provided to a channel of that port in the next connection cycle. If no channel is available the next cycle, the signal may continue to be delayed until an output channel is available.

Figure 8:
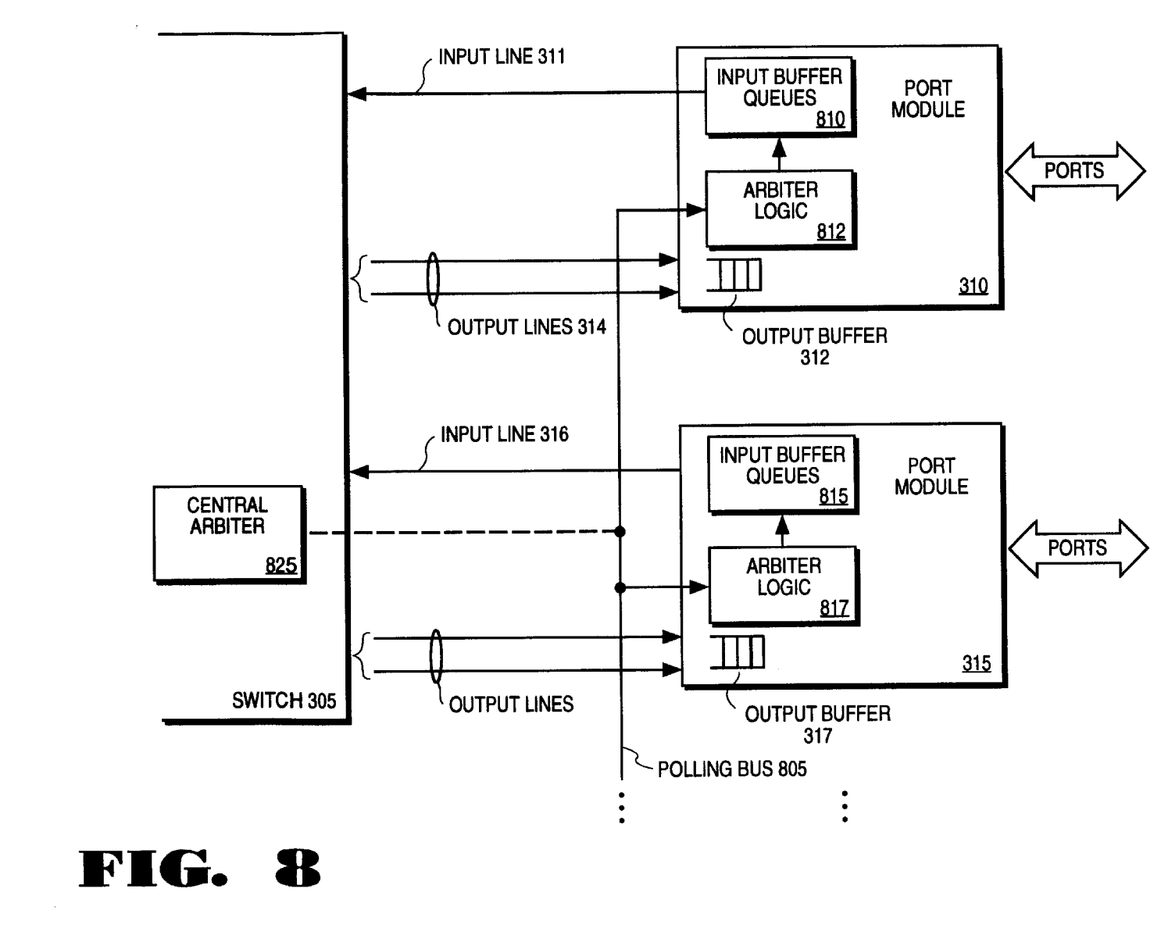
FIG. 8 shows a switch node that includes an asymmetric crosspoint switching fabric according to a present embodiment that further includes a polling bus for reducing blocking.

Generally, some form of arbitration scheme is required to manage access to the switch by the port modules. FIG. 8 shows the use of a polling bus 805 for reducing contention of the crosspoint switching fabric. Each of the port modules 310, 315, 320 (as shown in FIG. 3), and 325 (as shown in FIG. 3) are provided with port module-specific input buffer queues. Generally, for a switch node having N port modules, N−1 input buffer queues are provided for each port module. For example, port module 310 includes input buffer queues 810 wherein there are separate queues for buffering received packets destined for port modules 315, 320, and 325. Similarly, port module 315 includes input buffer queues 815 wherein there are separate queues for packets destined for port modules 310, 320, and 325. Ports 320 and 325 are also provided with input buffer queues. For some circumstances, it may be desirable to provide N buffer queues for each port module.

Each port module monitors the switching requests of every other port by monitoring polling bus 805 using arbiter logic. For example, if arbiter logic 812 of port module 310 requests to send a packet to port module, 315, arbiter logic 817 of port 315 detects the request. If the arbiter logic of a given port module determines that the maximum number of output channels for a given port module have already been requested, the arbiter logic may delay any pending requests for that port module and request that a packet from another input buffer queue be delivered to a different port module. In this manner, port modules of the switch node may avoid contention by detecting when all output lines of a destination port module are in use and requesting to switch a packet having a destination port module with available at least one output channel.

Figure 9:
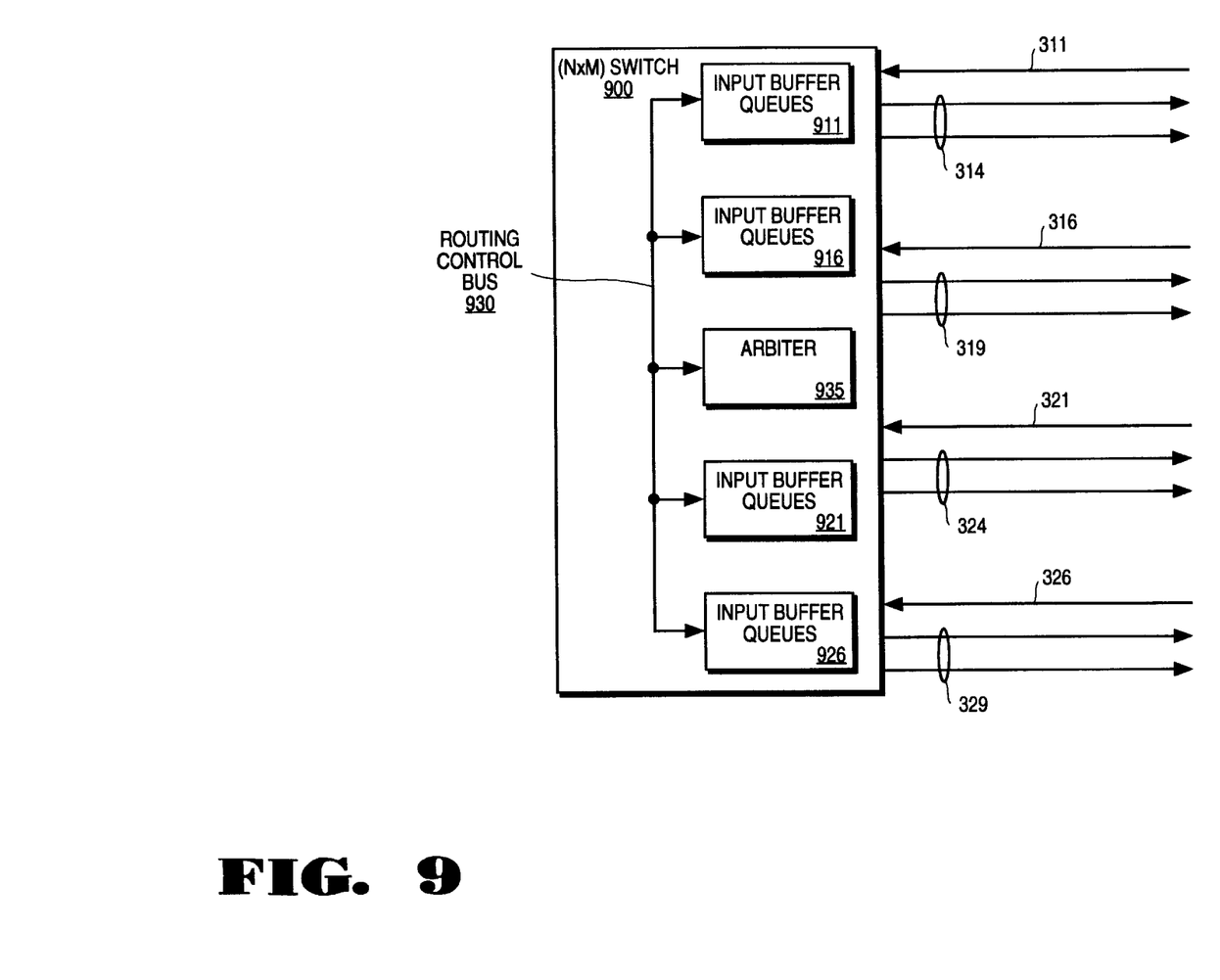
FIG. 9 shows an asymmetric crosspoint switching fabric according to a present embodiment that further includes an arbiter having global knowledge of switching requests of the input ports.

According to an alternative embodiment, a central arbiter may be coupled to the polling bus, and the required functionality of the arbitration logic located on the port modules may be reduced. FIG. 8 shows a central arbiter 825 in phantom lines as being located on switch module 305. FIG. 9 shows another possible modification for reducing port contention in a crosspoint switching fabric. For this example input buffer queues are provided at the switch rather than at the port modules. Thus, switch 900 is shown as including input buffer queues 911, 916, 921, and 926 coupled to input lines 311, 316, 321, and 326, respectively. An arbiter 935 is coupled to a routing control bus 930 to detect activity in each of input buffer queues 911, 916, 921, and 926. In this manner, arbiter 935 is provided with global knowledge of routing activity within switch 900, and arbiter 935 may implement simple routing algorithms to route packets through the crosspoint switch 900.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. In a network switch node, an asymmetric switch comprising:

N switch inputs each coupled to receive one or more packets from a respective one of N port modules, wherein N is an integer;

input buffers coupled to each one of the switch inputs, each of the packets being buffered in a respective one of the input buffers according to which of the port modules the packet is destined; and M switch outputs for coupling to the port modules, wherein M is an integer greater than N such that at least one of the port modules is coupled to more switch outputs than switch inputs; and a switching fabric operative to switch the packets buffered in the input buffers to the switch outputs, and wherein multiple packets being switched simultaneously to one of the port modules using switch outputs coupled to the one port module.

2. The asymmetric switch of claim 1, wherein the switching fabric operates as a crosspoint switch matrix.

3. The asymmetric switch of claim 2, wherein the crosspoint switch matrix includes at least one delay loop operative to delay a packet destined for a particular port module when no switch outputs to the particular port module are currently available.

4. The asymmetric switch of claim 2, further comprising an arbiter coupled to the input buffers for gathering global information regarding switching requests of the port modules, the arbiter using the global information to control switching of packets through the crosspoint switch matrix in a manner that reduces contention for the switch outputs.

5. The asymmetric switch of claim 1 wherein the switching fabric is a shared memory switching fabric.

6. The asymmetric switch of claim 1 wherein M is a multiple of N.

7. In a network switch node, an asymmetric switch comprising:
 a plurality of switch inputs each coupled to receive one or more packets from a respective one of a plurality of port modules;
 input buffers coupled to each one of the switch inputs, each of the packets being buffered in a respective one of the input buffers according to which of the port modules the packet is destined;
 a plurality of outputs each for coupling to a respective one of the plurality of port modules, wherein a throughput of the plurality of outputs exceeds a throughput of the plurality of inputs such that at least one connected port module is capable, at any given time, of receiving more packets from the switch than it transmits to the switch; and
 a switching fabric operative to switch the packets buffered in the input buffers to the plurality of outputs, and wherein multiple packets being switched simultaneously to one of the port modules using outputs coupled to the one port module.

8. In a network switch node, an asymmetric port module comprising:
 a network input to receive packets from a network;
 input buffers to buffer the packets before the packets are transmitted to a switch that includes a plurality of switch outputs, each of the packets being buffered in a respective one of the input buffers according to which of the plurality of switch outputs the packet is destined;
 at least one port module output coupled to the input buffers to transmit packets buffered therein to the switch;
 a network output to transmit packets to the network;
 port module inputs to receive packets from the switch, there being more port module inputs than port module outputs; and
 an output buffer coupled to buffer a plurality of packets received via the port module inputs during a single connection cycle and destined for the network output, and wherein multiple packets being switched simultaneously to one of the port modules using port module inputs for the one port module.

9. In a network switch node, an asymmetric port module comprising:
 a network input for coupling the asymmetric port module to a network;
 a plurality of input buffers, each for buffering packets received from the network destined for a respective one of a plurality of destination port modules;
 at least one switch output to transmit packets buffered in the plurality of input buffers to the switch;
 a plurality k of switch inputs to receive packets from the switch, there being more switch inputs than switch outputs, wherein k is any integer greater than 1; and
 arbiter logic coupled to the plurality of input buffers for coupling to the plurality of destination port modules via a polling bus, the arbiter logic detecting switching transactions made by the destination port modules and selectively transmitting a packet stored in an input buffer associated with a destination port module having an unrequested channel be transferred to the switch in response to the detected switching transactions.

10. The asymmetric port module of claim 9 further comprising at least one output buffer coupled to the plurality k of switch port module inputs for buffering packets received from the switch for transmission to the network via the network input.

11. In a network, a switch node comprising:
 N port modules for coupling the switch node to a plurality of network devices, each port module including
  a network input to receive packets from one or more of the plurality of network devices; and
  input buffers to buffer the packets before they are switched to another one of the port modules, each of the packets being buffered in a respective one of the input buffers according to which other one of the port modules the packet is destined, wherein N is an integer; and
 an asymmetric switch including
  N switch inputs, each switch input being coupled to receive packets from the input buffers of a respective one of the port modules;
  M switch outputs coupled to the port modules, wherein M is an integer greater than N such that at least one of the port modules is coupled to more than one of the switch outputs;
  a switching fabric operative to switch packets from the input buffers to the switch outputs; and
  a polling bus coupled to each of the plurality of port modules, wherein each port module further comprises
   arbiter logic coupled to the plurality of input buffers and the polling bus, the arbiter logic detecting switching transactions made by port modules to which the packets buffered in the input buffers are destined and, based on the switching transactions, selectively transmitting to the switch a packet from an input buffer that is destined for a port module having an unrequested channel.

12. The switch node of claim 11 wherein M=kN.

13. The switch node of claim 12 wherein k is an integer.

14. The switch node of claim 11 further comprising:
 a plurality N of switch input lines, each switch input line being coupled between one of the port modules and one of the N switch inputs of the asymmetric switch; and
 a plurality M of switch output lines, each switch output line being coupled between one of the M switch outputs of the asymmetric switch and one of the port modules such that at least one port module is coupled to more than one switch output of the asymmetric switch.

15. The switch node of claim 11 wherein M=kN, the switch node further comprising:
 a plurality N of switch input lines, each switch input line being coupled between one of the port modules and one of the N switch inputs of the asymmetric switch; and
 a plurality N of switch output lines wherein a throughput of the switch output lines is k times a throughput of switch input lines, each switch output line being coupled between k switch outputs of the M switch outputs of the asymmetric switch and one of the port modules such that at least one port module is coupled to more than one switch output of the asymmetric switch.

16. The switch node of claim 11 wherein each of the plurality of port modules include an associated output buffer for buffering packets received from the switch.

17. The switch node of claim 11 wherein the switching fabric operates as a crosspoint switch matrix.

18. The switch node of claim 17 wherein the crosspoint switch matrix include at least one delay loop operative to delay a packet destined for a particular port module when no outputs to the particular port module are currently available.

19. The asymmetric switch of claim 11 wherein the switching fabric is a shared memory switching fabric.

20. In a network, a switch node for switching packets between network devices connected to the switch node, the switch node comprising:

an asymmetric switch module comprising a plurality N of inputs, a plurality M of outputs wherein M=kN, and a switching fabric operative to switch packets received from the inputs to the outputs, wherein N is an integer and K is an integer greater than 1 and M is an integer greater than N;

a plurality N of port modules, each port module comprising at least one port interface for coupling the port module to a network device, a switch interface for coupling the port module to the asymmetric switch and at least N input buffers to buffer packets before they are output to the asymmetric switch via the switch interface, each of the packets being buffered in a respective one of the input buffers according to which other one of the port modules the packet is destined, the switch interface of each port module including one output to the asymmetric switch and k inputs from the asymmetric switch;

a plurality N of switch input lines coupled between the outputs of the switch interfaces and the inputs of the asymmetric switch;

a plurality M of switch output lines coupled between the outputs of the asymmetric switch and the inputs of the switch interfaces; and a polling bus coupled to each of the plurality of port modules, wherein each port module further comprises: arbiter logic coupled to the plurality of input buffers and the polling bus, the arbiter logic monitoring switching activity by other port modules to determine which port modules have at least one available transmission channel through the asymmetric switch module, the arbiter logic sending a packet to the asymmetric switch module only if a destination port module of the packet has at least one available transmission channel.

21. The switch node of claim 20 wherein each of the plurality of port modules includes an output buffer for buffering packets received from the asymmetric switch from the k input lines.

22. The switch node of claim 20 wherein the switching fabric operates as a crosspoint switch matrix.

23. The switch node of claim 22 wherein the crosspoint switch matrix include at least one delay loop operative to delay a packet destined for a particular port module when no outputs to the particular port module are currently available.

24. The asymmetric switch of claim 20 wherein the switching fabric is a shared memory switching fabric.

25. A switch node for switching packets on a network, the switch node comprising:

N port modules to couple the switch node to a plurality of network devices, wherein N is an integer; and an asymmetric switch module including
N switch inputs, each coupled to a respective one of the port modules to receive packets therefrom;
input buffers coupled to each one of the switch inputs to buffer packets received via the switch inputs, each of the packets being buffered in one of the input buffers according to which of the port modules the packet is destined; and
M switch outputs coupled to output the packets buffered in the input buffers to the port modules, M being an integer greater than N so that at least one of the port modules is coupled to more switch outputs than switch inputs, and wherein multiple packets are capable of being switched simultaneously to one of the port modules using switch outputs coupled to the one port module.

26. A switch node for switching packets on a network, the switch node comprising:

an asymmetric switch module including N switch inputs, wherein N is an integer, more than N switch outputs and switching fabric to transfer packets from the switch inputs to the switch outputs; and a plurality of port modules including N port module outputs coupled to transmit packets to the N switch inputs and more than N port module inputs coupled to receive packets from the more than N switch outputs, and wherein each port module includes
a network interface to receive packets from one or more network devices; and
input buffers to buffer packets received via the network interface, each of the packets being buffered in a respective one of the input buffers according to which other of the plurality of port modules the packet is destined, and wherein multiple packets are capable of being switched simultaneously to one of the port modules using switch outputs coupled to the one port module.

\* \* \* \* \*